US008208433B2

(12) United States Patent
Chakraborty et al.

(10) Patent No.: US 8,208,433 B2
(45) Date of Patent: Jun. 26, 2012

(54) METHOD AND APPARATUS FOR ALLOCATING RESOURCES IN WIRELESS COMMUNICATION SYSTEM

(75) Inventors: Soumen Chakraborty, Santa Clara, CA (US); Sindhu Verma, Santa Clara, CA (US); Manish Airy, Santa Clara, CA (US); Anuj Puri, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 493 days.

(21) Appl. No.: 12/372,678

(22) Filed: Feb. 17, 2009

(65) Prior Publication Data

US 2009/0207796 A1  Aug. 20, 2009

(51) Int. Cl.
*H04W 4/00* (2009.01)
(52) U.S. Cl. ......... 370/329; 370/341; 455/450; 455/509
(58) Field of Classification Search .................. None
See application file for complete search history.

(56) References Cited

U.S. PATENT DOCUMENTS

| | | | |
|---|---|---|---|
| 6,144,653 A | 11/2000 | Persson et al. | |
| 6,567,375 B2 | 5/2003 | Balachandran et al. | |
| 6,987,738 B2 | 1/2006 | Subramanian et al. | |
| 2005/0063347 A1 | 3/2005 | Sarkkinen et al. | |
| 2005/0201269 A1* | 9/2005 | Shim et al. | 370/329 |
| 2006/0007849 A1* | 1/2006 | Kim et al. | 370/329 |
| 2006/0164969 A1* | 7/2006 | Malik et al. | 370/328 |
| 2007/0184842 A1* | 8/2007 | Pedersen et al. | 455/450 |
| 2007/0206561 A1 | 9/2007 | Son et al. | |
| 2007/0274253 A1* | 11/2007 | Zhang et al. | 370/328 |
| 2007/0293231 A1* | 12/2007 | So | 455/450 |
| 2008/0095037 A1* | 4/2008 | Chang et al. | 370/329 |
| 2009/0022098 A1* | 1/2009 | Novak et al. | 370/329 |
| 2009/0070650 A1* | 3/2009 | Bourlas et al. | 714/748 |
| 2009/0075667 A1* | 3/2009 | Bourlas | 455/452.1 |

OTHER PUBLICATIONS

International Search Report and Written Opinion, dated Apr. 28, 2009, for PCT Appl. No. PCT/US2009/034432, 10 pages.

* cited by examiner

*Primary Examiner* — Jeffrey M Rutkowski
(74) *Attorney, Agent, or Firm* — Sterne, Kessler, Goldstein & Fox P.L.L.C.

(57) ABSTRACT

A method and apparatus i.e. Base Station for allocating resources in a wireless communication system is provided. The method includes generating a plurality of first groups of allocation units based on one or more of a plurality of Modulation and Coding Schemes (MCSs) and traffic characteristics in the wireless communication system. The method further includes generating a second group of slots including resource allocation information for mapping first groups of allocation units to Mobile Stations (MSs) based on MCSs and traffic characteristics associated with first groups of allocation units and the MSs. Thereafter, the method persistently allocates each first group of allocation units to the MSs based on one or more of the resource allocation information and a communication state associated with each MS. Further, the method also identifies if each MS has succeeded in decoding the persistent resource allocation sent in the second group of slots.

23 Claims, 5 Drawing Sheets

METHOD AND APPARATUS FOR ALLOCATING RESOURCES IN WIRELESS COMMUNICATION SYSTEM

FIELD OF THE INVENTION

This application claims the benefit of U.S. Provisional Application Number 61/066,344, filed Feb. 19, 2008.

The invention generally relates to wireless communication systems. More specifically, the invention relates to a method and apparatus i.e. Base Station for allocating resources in a wireless communication system.

BACKGROUND OF THE INVENTION

A wireless communication system typically includes a plurality of Base Stations (BSs) and a plurality of Mobile Stations (MSs). Each BS of the plurality of BSs has a range of coverage up to which the BS can transmit data packets. A BS transmits data packets within transmission frames to each MS of the plurality of MSs through a Downlink (DL). Similarly, each MS transmits data packets to the BS through an Uplink (UL).

A transmission frame transmitted by a BS to a MS of the plurality of MSs includes resource allocation information associated with the MS. The resource allocation information includes a DL MAP and an UL MAP specifying DL and UL resource allocation associated with the MS to receive and transmit data packets respectively. The DL and UL MAPs are transmitted in each transmission frame. The resources include frequency and time slots in the transmission frame. The DL MAP and the UL MAP thus schedule the communication between the BS and the plurality of MSs. Transmitting the DL and UL MAPs in each transmission frame leads to significant overhead in the wireless communication system.

For applications generating periodic data packets, the resource requirements of an MS can be pre-determined. For example, if periodic data is generated by the application with a period of four transmission frames, the BS persistently allocates resources to the MS in every fifth transmission frame. As a result, the resource allocation information corresponding to the persistent resource allocation is transmitted in the first transmission frame and need not be transmitted in every fifth transmission frame. This reduces the amount of resource allocation information that needs to be sent to each MS in the subsequent transmission frames.

However, the BS may change the persistent allocations if, for instance, a quality of communication channel between a MS and the BS either improves or deteriorates. For example, an MS using a first Modulation and Coding Scheme (MCS) corresponding to a quality of a communication channel may be switched to a second MCS when the quality of the communication channel changes. This switch is indicated to the MS by the BS by transmitting additional relevant resource allocation information to the MS. Thus, each such change from the persistent allocations requires additional resource allocation information to be included in the DL MAP and UL MAP thereby increasing the overhead in the wireless communication system.

Further, the departure of an MS from a coverage area of a BS leads to de-allocation of resources initially allocated to the MS. The de-allocation of resources results in the formation of one or more unused slots i.e., holes in a transmission frame. These un-used slots may be allocated to one or more MSs of the plurality of MSs communicating with the BS by shifting the resource allocations of the other MSs so as to utilize the holes. Such changes in resource allocations either needs to be communicated to each MS thereby incurring additional DL and UL MAP overhead or has to be inferred by each MS whenever there is de-allocation information in the DL or UL MAP.

In the wireless communication system, due to frequent changes in communication channel quality, it is likely that a MS may be unable to decode the DL MAP or UL MAP. The DL MAP or UL MAP may include either a new persistent allocation or de-allocation of a previous persistent allocation associated with the MS. Consequently, the MS may not recognize that the BS has changed resource allocation for the MS in the subsequent frames. Thus, the MS may incorrectly attempt to receive on the DL or transmit on the UL. This results in a loss of transmission throughput on either the DL or the UL.

Therefore, there is a need for a method and an apparatus for reducing DL MAP and UL MAP overhead and efficiently utilizing communication resources, in the presence of MAP errors introduced by frequent changes in communication channel quality.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
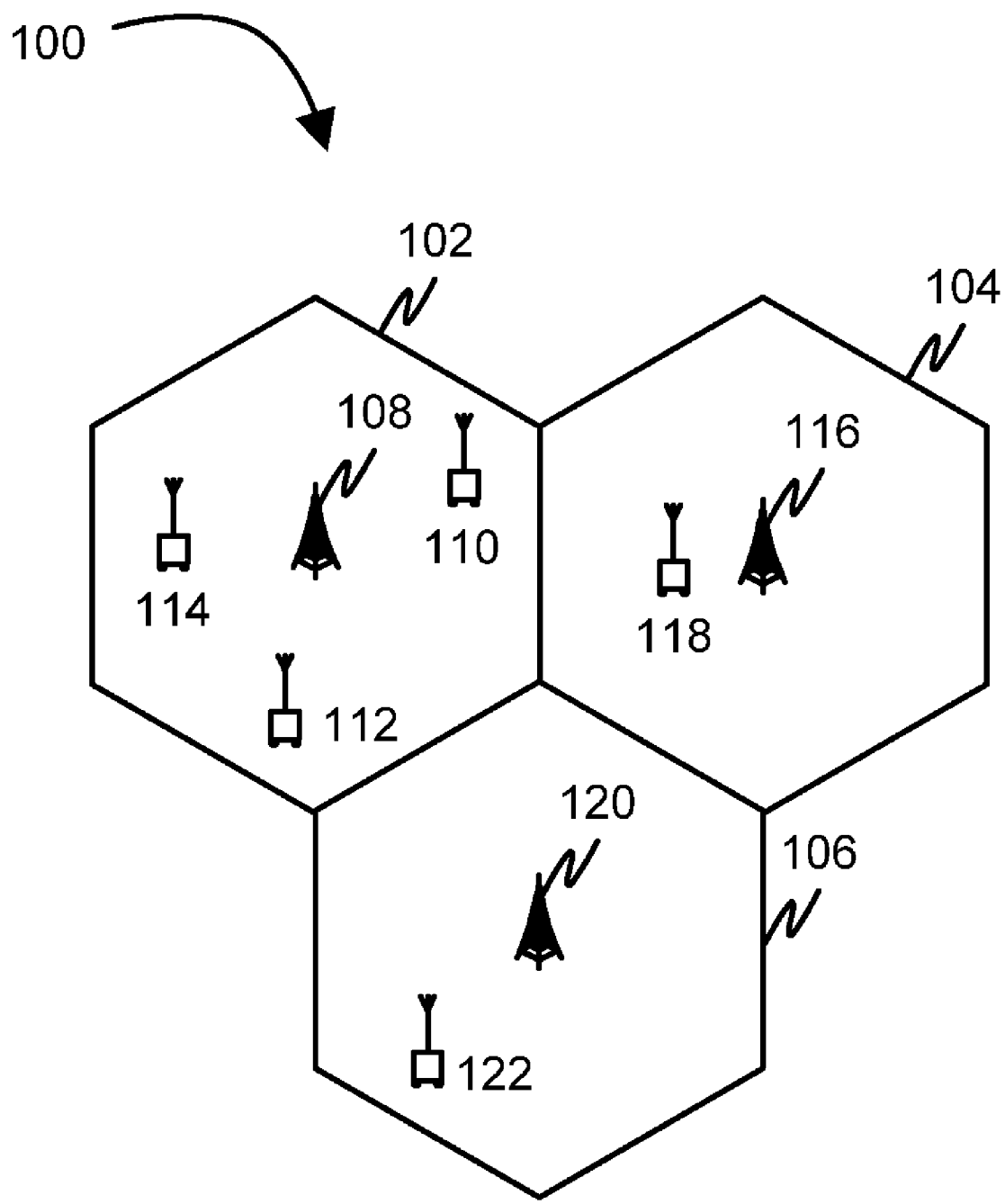
FIG. 1 illustrates a wireless communication system in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to communication in a wireless communication system. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments described herein may be comprised of one or more conventional processors and unique stored program instructions that control the one or more processors to implement, in conjunction with certain non-processor circuits, some, most, or all of the functions of method and apparatus for communication in a wireless communication system. The non-processor circuits may include, but are not limited to, a radio receiver, a radio transmitter, signal drivers, clock circuits, power source circuits, and user input devices.

Various embodiments of the invention provide method and apparatus for communication in a wireless communication system. The method includes generating a plurality of first groups of allocation units based on one or more of a plurality of Modulation and Coding Schemes (MCSs) and traffic characteristics in the wireless communication system. The traffic characteristics are associated with a periodicity and a size of data packets communicated within the wireless communication system. An allocation unit of the first group of allocation units comprises one or more slots i.e. frequency and time slots. The method further includes generating a second group of slots. The second group of slots includes resource allocation information for mapping each first group of allocation units to one or more Mobile Stations (MSs) of a plurality of MSs based on MCSs and traffic characteristics associated with each first group of allocation units and the one or more MSs. The method further includes allocating each first group of allocation units to the one or more MSs based on one or more of the resource allocation information and a communication state associated with each MS of the plurality of MSs.

FIG. 1 illustrates a wireless communication system 100 in which various embodiments of the invention may function. Wireless communication system 100 includes a plurality of cells for example, as depicted in FIG. 1, the plurality of cells includes, a cell 102, a cell 104 and a cell 106. In a cell of the plurality of cells, one or more Mobile Stations (MSs) are served by a Base Station (BS). For example, in cell 102, a BS 108 serves one or more MSs including a MS 110, a MS 112 and a MS 114. Similarly, in cell 104, a BS 116 serves a MS 118 and in cell 106, a BS 120 serves a MS 122. Examples of wireless communication network 100 may include, but are not limited to, a Worldwide Interoperability for Microwave Access (WiMAX) communication network, a 3rd Generation Partnership Project (3GPP) network including 3GPP Long Term Evolution (LTE) network, a 3rd Generation Partnership Project 2 (3GPP2) network including 3GPP2 Ultra Mobile Broadband (UMB) network, a Wireless Fidelity (WiFi) network, and any variant of Orthogonal Frequency Division Multiple Access (OFDMA) communication network.

In a cell, a BS communicates with each MS in the cell through a communication link assigned for each MS in the cell. The communication link includes a Downlink (DL) and an Uplink (UL). For example, in cell 102, BS 108 transmits data packets to MS 110 through a DL assigned for MS 110. Similarly, MS 110 transmits data packets to BS 108 through an UL assigned for MS 110. The data packets may include data and voice packets.

BS 108 allocates resources to MSs such as, MS 110, MS 112 and MS 114, in cell 102 for communication. The resources may include for example, frequency and time slots for a MS to communicate with a BS. BS 108 communicates resource allocation information to each MS in cell 102 to configure a communication link of each MS in cell 102. The resource allocation information includes a DL MAP and an UL MAP corresponding to resources associated with a DL and a UL respectively. BS 108 transmits the resource allocation information in each transmission frame to indicate to each MS in cell 102 the resources allocated in the transmission frame for each MS. The MSs in cell 102 receive the resource allocation information and communicate with BS 108 based on the resources allocated. For example, MS 110 communicates with BS 108 based on the resource allocation information received from BS 108. MS 110 receives data packets from BS 108 using resources allocated according to a DL MAP corresponding to MS 110. Further, MS 110 transmits data packets to BS 108 using resources allocated according to a UL MAP corresponding to MS 110. Similarly, MS 112 and MS 114 communicate with BS 108 based on resource allocation information received from BS 108.

Figure 2:
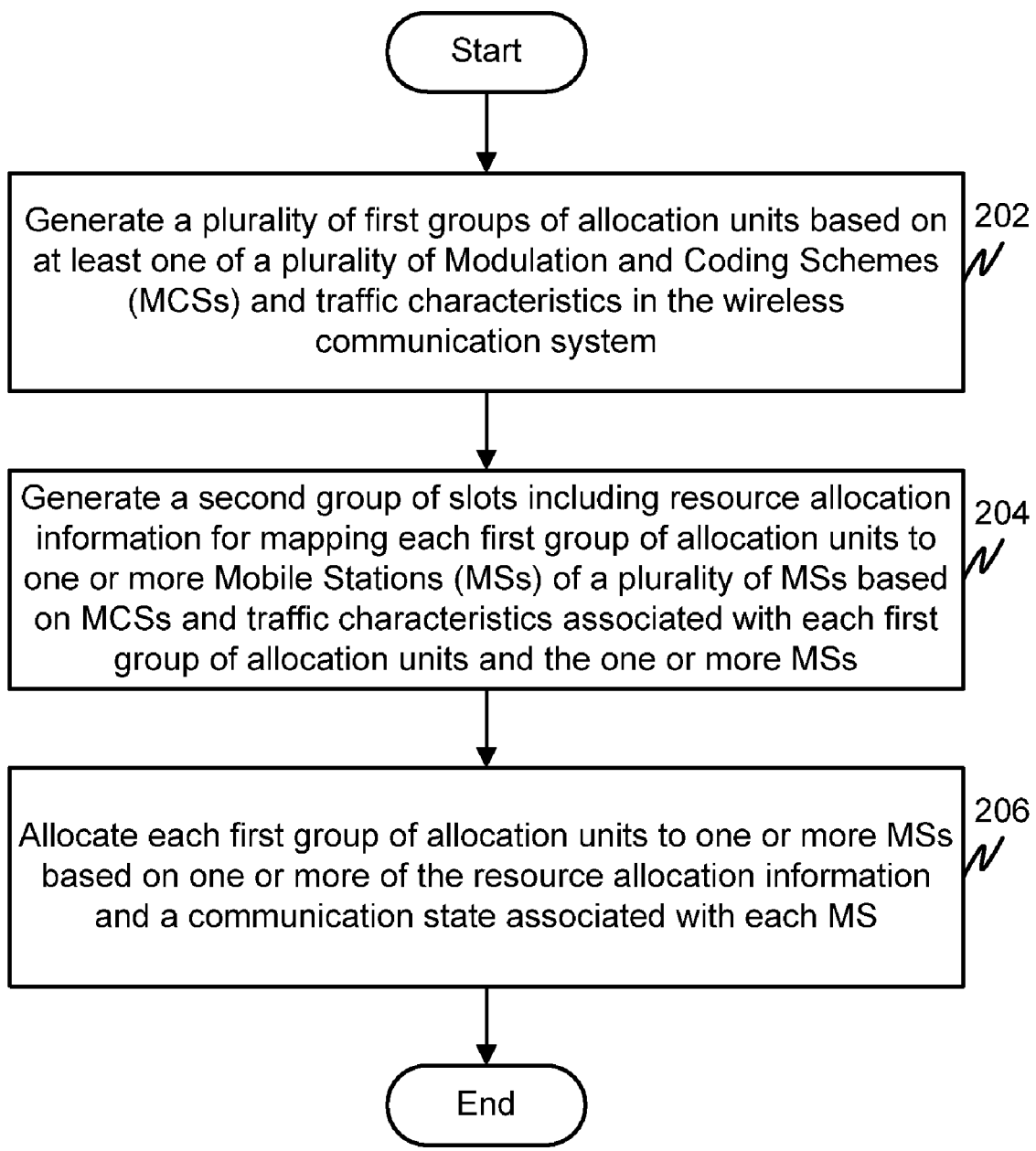
FIG. 2 illustrates a flow chart of a method of communication in a wireless communication system in accordance with an embodiment of the invention.

FIG. 2 is a flow chart illustrating a method of communication in wireless communication system 100 in accordance with an embodiment of the invention. In order to setup a communication in wireless communication system 100, a BS allocates resources to a plurality of MSs so as to enable the plurality of MSs to transmit and receive data packets. At step 202, a plurality of first groups of allocation units are generated based on one or more of a plurality of Modulation and Coding Schemes (MCSs) and traffic characteristics in wireless communication system 100. A first group of allocation units of the plurality of first groups of allocation units includes one or more allocation units. An allocation unit includes one or more slots in which a MS transmits data packets to a BS or receives data packets from the BS. For example, a WiMax (IEEE 802.16) wireless communication system includes orthogonal frequency division multiplexing (OFDM) and an allocation unit includes one or more OFDM slots. Therefore, one or more allocations units are grouped together to form a first group based on a MCS employed for transmitting the resource allocation information, the data packets and the traffic characteristics. The traffic characteristics correspond to a periodicity and a size of data packets communicated in wireless communication system 100. Each first group of allocation units is associated with a periodicity and a size of a data packet. As the first group of allocation units is associated with a particular MCS, each allocation unit of a first group of allocation units is of the same size. Further, size of a first group of allocation units is averaged over a predefined number of transmission frames based on the number of MSs using one or more MCSs.

In an embodiment, the plurality of MCSs may be a pre-defined number of MCSs selected from various MCSs used in wireless communication system 100. The pre-defined number of MCSs may be a reduced number of MCSs of the various MCSs. Each first group of allocation units of the plurality of first groups of allocation units is associated with a MCS of the plurality of MCSs. Thus, number of first groups of allocation units in the plurality of first groups of allocation units may be reduced due to the usage of pre-defined number of MCSs. For example, if the plurality of first groups of allocation units includes four first groups of allocation units. Then, four first groups of allocation units are associated with four different MCSs and traffic characteristics. The four different MCSs are selected from the various MCSs used in wireless communication system 100.

An allocation unit of the plurality of first groups of allocation units may be mapped to a MS of a plurality of MSs in wireless communication system 100. The MS is mapped to the allocation unit based on resource allocation information. For this, at step 204, a second group of slots is generated. The second group of slots includes the resource allocation information for the plurality of first groups of allocation units. In an embodiment, the plurality of first groups of allocation units and the second group of slots form one or more transmission frames. The resource allocation information may be used for mapping each first group of allocation units to one or more MSs of the plurality of MSs. The mapping is performed based on a MCS and traffic characteristics associated with each first group of allocation units and the one or more MSs. For example, a MCS and traffic characteristics associated with a first group of allocation units of the plurality of first group of allocation units is compared with MCSs and traffic characteristics associated with MS 110, MS 112 and MS 114. Based on the comparison, if MS 110 is identified to have a MCS and traffic characteristics same as that of the first group of allocation units then MS 110 is mapped to an allocation unit of the first group of allocation units. This mapping information for MS 110 is included in the resource allocation information.

The resource allocation information includes a plurality of Information Elements (IEs) corresponding to a persistent allocation of the plurality of first groups of allocation units to the plurality of MSs. The plurality of IEs include an IE indicating a boundary of a first group of allocation units of the plurality of first groups of allocation units mapped to one or more MSs of the plurality of MSs. The plurality of IEs further includes an IE indicating a first group of allocation units mapped to the one or more MSs and a position of an allocation unit in the first group of allocation units mapped to an MS of the one or more MSs. The plurality of IEs is further explained in detail in conjunction with FIG. 4.

In addition to the resource allocation information, the second group of slots further includes one or more slots for one or more Hybrid Automatic Repeat Request (HARQ) retransmissions associated with one or more MSs of the plurality of MSs. A HARQ retransmission associated with a MS enables retransmission of a data packet between a BS and the MS. The allocation of the HARQ retransmissions in the second group of slots is explained further in detail in conjunction with FIG. 4.

The resource allocation information is transmitted to each MS of the plurality of MSs. Thereafter, at step 206, each first group of allocation units is allocated to the one or more MSs based on one or more of the resource allocation information and a communication state associated with each MS of the plurality of MSs. The one or more MSs and a first group of allocation units allocated to the one or more MSs have a same MCS and traffic characteristics. In an embodiment, the allocation is one of a persistent allocation and a non-persistent allocation.

In addition to the MCS and traffic characteristics associated with an MS of the plurality of MSs, a communication state of the MS further determines allocation of the MS to a first group of allocation units of the plurality of first groups of allocation units. The communication state associated with each MS of the plurality of MSs is one of an active communication state and an inactive communication state. An allocation of the plurality of MSs to the plurality of first groups of allocation units based on a communication state associated with each MS of the plurality of MSs is explained in detail in conjunction with FIG. 3.

Figure 3:
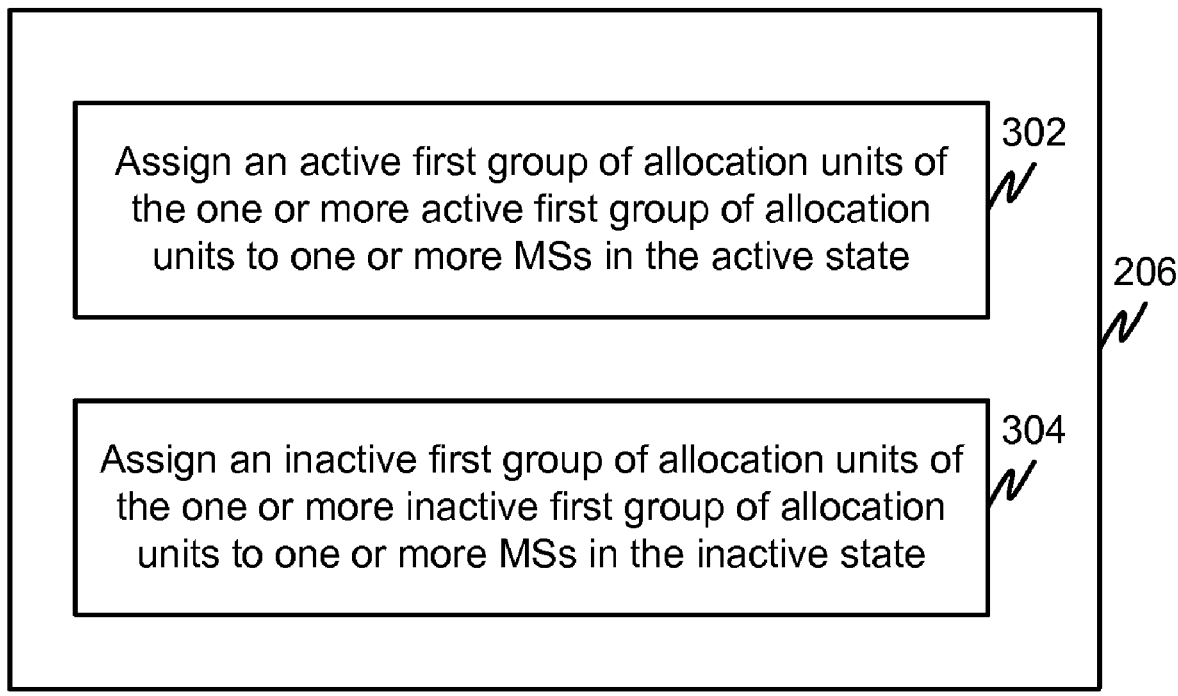
FIG. 3 illustrates a method of allocating resources in a wireless communication system in accordance with an embodiment of the invention.

FIG. 3 illustrates a method of allocating resources in wireless communication system 100 in accordance with an embodiment of the invention. In an embodiment, the plurality of first groups of allocation units may include one or more active first group of allocation units associated with one or more MSs of the plurality of MSs in the active communication state. The plurality of first groups of allocation units further includes one or more inactive first group of allocation units associated with one or more MSs of the plurality of MSs in the inactive communication state.

At step 302, the active first group of allocation units of the one or more active first group of allocation units is assigned to the one or more MSs of the plurality of MSs in the active communication state. The assigning is performed based on an MCS and traffic characteristics associated with the active first group of allocation units and the one or more MSs. Thus, a MCS and traffic characteristics associated with the active first group of allocation units corresponds to MCSs and traffic characteristics associated with the one or more MSs. Moreover, the one or more MSs is identified from the plurality of MSs based on a communication state associated with each MS of the one or more MSs. If the one or more MSs is identified as in the active communication state, then the one or more MSs is assigned to the active first group of allocation units.

In an embodiment, prior to assigning a MS of the one or more MSs to an active first group of allocation units, a MCS associated with the MS in the active communication state is verified. This process is performed to verify whether the MCS associated with the MS is different from a MCS associated with the one or more active first group of allocation units. The MCS associated with the MS may be a MCS requested by the MS. If the MCS associated with the MS is different, then the MCS is transformed to a MCS associated with the active first group of allocation units. Thereafter, the MS is allocated resources in the active first group of allocation units.

Subsequent to allocation of the active first group of allocation units to the MS, the MS may request for a change to a new MCS by providing a channel feedback to the BS. The request for the new MCS is made by the MS when a quality of a communication channel between the MS and a BS deviates from an acceptable level. In such a situation, the process of verification is performed to verify whether the new MCS requested by the MS is different from each MCS of the one or more active first groups of allocation units. If the requested MCS is different, then the requested MCS may be transformed to a MCS similar to the requested MCS, of the plurality of MCSs associated with one or more active first groups of allocation units, so as to control a number of MCS employed in wireless communication system 100. Thereafter, the MS is transitioned from a previously allocated active first group of allocation unit to another active first group of allocation units associated with the transformed MCS. Alternatively, the MS may be transitioned to an active first group generated associated with the requested MCS.

For example, for allocating resources to MS 114 in cell 102, a MCS associated with MS 114 is verified. If the MCS associated with MS 114 varies from each MCS associated with one or more active first groups of allocation units, then the MCS associated with MS 114 is transformed to one of the MCSs associated with the one or more active first groups of allocation units. Accordingly, MS 114 is assigned to an active first group of allocation units. Thereafter, over time, MS 114 may request for a change in the MCS currently used based on variations in a communication channel between MS 114 and BS 108. In such a case, MS 114 may request for a MCS different from the MCS currently used by MS 114. In response to the request, BS 108 performs a verification to identify if the MCS requested by MS 114 corresponds to MCSs of the one or more active first groups of allocation units. In an embodiment, if the MCS requested by MS 114 is different from each MCS associated with the one or more active first groups of allocation units, the requested MCS is transformed to a MCS, similar to the MCS requested by MS 114, of the plurality of MCSs associated with the one or more active first groups of allocation units. Then MS 114 is transitioned from a previously allocated active first group of allocation unit to another active first group of allocation units associated with the transformed MCS. In another embodiment, MS 114 may be transitioned to an active first group generated associated with the requested MCS. For associating MS 114 to the new active first group, additional resource allocation information for allocating the MS with the new active first group of allocation units is transmitted to the MS.

In an embodiment, the transitioning of a MS is performed based on a feedback received from the MS over a predefined averaging window. The feedback transmitted by the MS includes link quality measurements associated with a DL and a UL between the MS and a BS. The link quality measurements may include for example, an Error Rate, an Error Probability, a Carrier to Interference Ratio (CIR), a Carrier to Noise Ratio (CNR), a Carrier to Interference-plus-Noise Ratio (CINR), a Signal to Interference Ratio (SIR), a Signal to Noise Ratio (SNR), and a Signal to Interference-plus-Noise Ratio (SINR).

A time period of the predefined averaging window is increased to a predefined value so as to increase the time period between requests from an MS for a change in a MCS.

For example, MS 114 communicates to BS 108 using a MCS. MS 114 monitors the link quality between MS 114 and BS 108 for an SNR value. The SNR value is averaged over a predefined averaging window, such as 10 milliseconds (ms). After 10 ms, if the average value of SNR deviates from an acceptable level, then MS 114 requests BS 108 to change the MCS used by MS 114 to a new MCS for improving Quality of Service (QoS). Therefore, MS 114 may approach BS 108 with a request to change MCS after the predefined averaging window interval. Each such request which results in changes cause additional overhead in the form of resource allocation information sent by BS 108 to MS 114 for allocating the resources based on the new MCS. By increasing the predefined averaging window from 10 ms to 40 ms, the frequency of transitions of MS 114 from one MCS to another is decreased thereby reducing the overhead in wireless communication system 100.

In step 304, an inactive first group of allocation units of the one or more inactive first group of allocation units is assigned to one or more MSs of the plurality of MSs in an inactive communication state. The assigning is performed based on an MCS and traffic characteristics associated with the inactive first group of allocation units and the one or more MSs. Thus, a MCS and traffic characteristics associated with the inactive first group of allocation units corresponds to MCSs and traffic characteristics associated with the one or more MSs. Moreover, the one or more MSs is identified from the plurality of MSs based on a communication state associated with each MS of the one or more MSs. If the one or more MSs is identified as in the inactive communication state, then the one or more MSs is assigned the inactive first group of allocation units.

In an embodiment, prior to assigning a MS of the one or more MSs to an inactive first group of allocation units, a MCS associated with the MS in the inactive communication state is verified. This process is performed to verify whether the MCS associated with the MS is different from a MCS associated with the one or more inactive first group of allocation units. The MCS associated with the MS may be a MCS requested by the MS. If the MCS associated with the MS is different, then the MCS is transformed to a MCS associated with the inactive first group of allocation units. Thereafter, the MS is allocated resources in the inactive first group of allocation units.

Subsequent to allocation of the inactive first group of allocation units to the MS, the MS may request for a change to a new MCS by providing a channel feedback to the BS. The request for the new MCS may be made by the MS when the MS changes from the inactive communication state to the active communication state. In such a situation, the process of verification is performed to verify whether the new MCS requested by the MS is different from each MCS of one or more active first groups of allocation units. If the requested MCS is different, then the MS may be transitioned to a MCS, similar to the requested MCS, of the plurality of MCSs associated with one or more active first groups of allocation units, so as to control a number of MCS employed in wireless communication system 100. Thereafter, the MS is allocated resources in an active first group of allocation units corresponding to the MCS.

When a MS is allocated resources in a new first group of allocation units in response to a request from the MS for a change in MCS, then an allocation unit of a first group of allocation units previously allocated to the MS is de-allocated. The de-allocated allocation unit is referred to as a hole. The new first group of allocation units may be one of an active first group of allocation units and an inactive first group of allocation units. Similarly, the first group of allocation units having the de-allocated allocation unit may be one of an active first group of allocation units and an inactive first group of allocation units.

In an embodiment, the de-allocated allocation unit of the first group of allocation units may be allocated to a MS of the plurality of MSs based on a MCS and traffic characteristics associated with the first group of allocation units having the de-allocated allocation unit. Alternatively, the de-allocated allocation unit of the first group of allocation units may be allocated to one or more HARQ retransmission associated with one or more MSs of the plurality of MSs. The allocation of a de-allocated allocation unit is explained further in detail in conjunction with FIG. 4.

Figure 4:
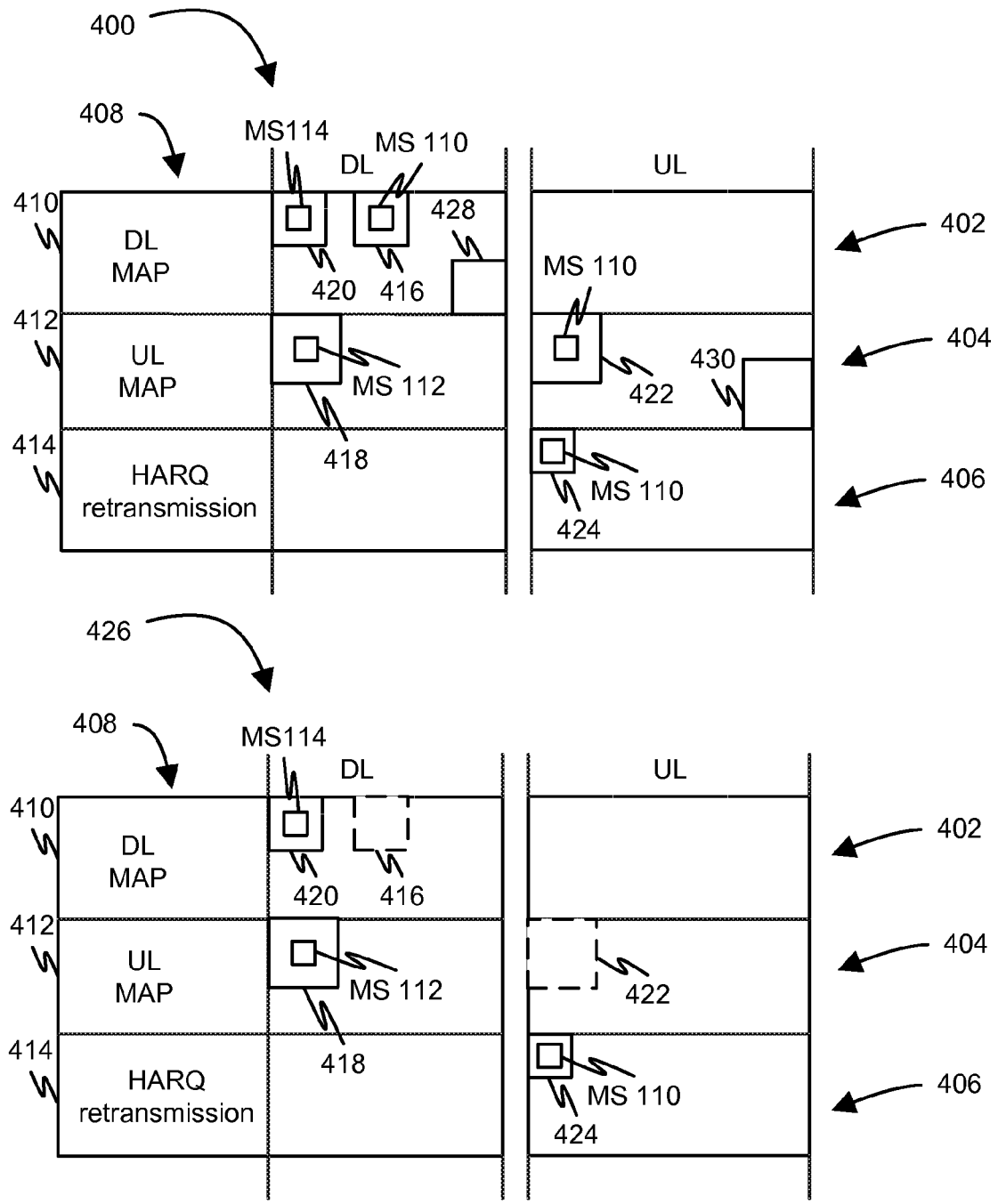
FIG. 4 illustrates exemplary transmission frames depicting the allocation of resources in a wireless communication system in accordance with an embodiment of the invention.

FIG. 4 illustrates a transmission frame 400 depicting the allocation of resources in wireless communication system 100 in accordance with an exemplary embodiment. Transmission frame 400 includes two active first groups of allocation units such as, an active first group of allocation units 402 and an active first group of allocation units 404, and an inactive first group of allocation units 406. The active and inactive first groups of allocation units 402, 404 and 406 are depicted in a similar manner for DL and UL in FIG. 4. However, it will apparent to a person skilled in the art that the active and inactive first groups of allocation units 402, 404 and 406 are distinct from one another. Further, number and size of active and inactive first groups of allocation units in the DL and UL may vary.

Active first group of allocation units 402 is associated with a MCS and traffic characteristics different from a MCS and traffic characteristics associated with active first group of allocation units 404. Further, a MCS associated with inactive first group of allocation units 406 may be different from MCSs associated with active first groups of allocation units 402 and 404. The allocation units of inactive first group of allocation units 406 may be allocated to one or more MSs in an inactive communication state having different MCSs than requested by the one or more MSs and similar traffic characteristics by transitioning the MCS to a MCS that is associated with the inactive first group of allocation units.

The transmission frame 400 further includes a second group of slots 408. Second group of slots 408 includes resource allocation information. The resource allocation information includes a Downlink (DL) MAP 410 and an Uplink (UL) MAP 412 for allocating resources to MS 110 and MS 112 in a DL and an UL respectively. Second group of slots 408 further includes a region 414. The region 414 includes one or more slots that may be used for a plurality of HARQ retransmissions. Second group of slots 408 is communicated to MS 110 and MS 112 by BS 108 for transmitting respective resource allocation information to MS 110 and MS 112. MS 110 and MS 112 receives second group of slots 408 and communicates with BS 108 based on the resource allocation information.

DL MAP 410 indicates mapping of allocation units 416, 418 and 420 to MS 110, MS 112 and MS 114 respectively, in active first groups of allocation units 402 and 404. The allocation units 416, 418 and 420 may be utilized by MS 110, MS 112 and MS 114 to receive data packets from BS 108. DL MAP 410 includes a plurality of IEs. The plurality of IEs includes an IE indicating active first groups of allocation units 402 and 404 in which MS 110, MS 112 and MS 114 are to be allocated and positions of allocation units 416, 418 and 420. Moreover, separate IEs of the plurality of IEs indicate a MCS associated with MS 110, MS 112 and MS 114 used in the DL, a boundary of active first groups of allocation units 402 and 404, and the size of allocation units 416, 418 and 420. It will be apparent to a person skilled in the art that the plurality of IEs may include IEs other than the IEs enumerated above.

Similarly, UL MAP 412 indicates an allocation unit 422 allocated to MS 110 in the UL. UL MAP 412 includes a plurality of IEs. The plurality of IEs includes an IE indicating active first group of allocation units 404 in which MS 110 is to be allocated and a position of allocation unit 422. Further, separate IEs of the plurality of IEs indicate a MCS associated with MS 110 in the UL, a boundary of active first group of allocation units 404 and a size of allocation unit 422. It will be apparent to a person skilled in the art that the plurality of IEs may include IEs other than the IEs enumerated above.

Considering the case in which a periodicity of data packets transmitted by MS 110, MS 112 and MS 114 to BS 108 is one, then only IEs of the plurality of IEs indicating active first groups of allocation units 402 and 404 to which MS 110, MS 112 and MS 114 are to be allocated and positions of allocation units allocated to MS 110, MS 112 and MS 114 in the UL and DL is transmitted in each transmission frame subsequent to transmission frame 400. Further, since MS 110 and MS 114 belong to same active first groups of allocation units IEs associated with a MCS of MS 110 and MS 114, IEs associated with size of allocation units 416 and 420 and an IE associated with a boundary of active first group of allocation units 402 are not transmitted in each transmission frame subsequent to transmission frame 400.

As a result, number of IEs included in each subsequent transmission frame is reduced thereby decreasing the size of the DL and UL MAPs. Thus, the MAP overhead in wireless communication 100 is reduced.

When MS 110 enters an inactive communication state, MS 110 may transmit less number of data packets in the UL. Therefore, for transmission in the inactive communication state, MS 110 is allocated an allocation unit 424 in inactive first group of allocation units 406. Thus, UL MAP 412 may include plurality of IEs including an IE indicating inactive first group of allocation units 406 in which MS 110 is to be allocated and a position of allocation unit 424 allocated to MS 110. Further, separate IEs of the plurality of IEs indicate a MCS associated with MS 110 in the UL, a boundary of active first group of allocation units 406 and a size of allocation unit 424. It will be apparent to a person skilled in the art that the plurality of IEs may include IEs other than the IEs enumerated above.

The allocation may be a persistent allocation or a non persistent allocation. In case allocation is persistent allocation and a periodicity of data packets transmitted by MS 110 in the UL is one, then only IEs of the plurality of IEs indicating inactive first group of allocation units 406 to which MS 110 is to be allocated and the position of allocation unit 424 allocated to MS 110 in the UL is transmitted in each transmission frame subsequent to transmission frame 400. Further, since MS 110 belong to inactive first groups of allocation units, an IE associated with a MCS of MS 110, an IE associated with size of allocation unit 424 and an IE associated with a boundary of inactive first group of allocation units 406 are not transmitted in each transmission frame subsequent to transmission frame 400.

As a result, number of IEs included in each subsequent transmission frame is reduced thereby decreasing the size of the DL and UL MAPs. Thus, the MAP overhead in wireless communication 100 is reduced.

Further, if MS 110 terminates a transmission session with BS 108 then BS 108 de-allocates allocation units 416 and 422 allocated to MS 110 in the DL and UL. These de-allocated allocation units are referred as holes. The de-allocated allocation units 416 and 422 are depicted in a transmission frame 426. In an embodiment, the allocation units 416 and 422 may be allocated to a MS associated with a MCS of active first group of allocation units 402 in a DL and a MS associated with a MCS of active first group of allocation units 404 in an UL respectively. The MS may be one of a MS presently communicating with BS 108 and a MS establishing an initial communication with BS 108.

In another embodiment, de-allocated allocation units 416 and 422 may be allocated for one or more HARQ retransmissions of the plurality of HARQ retransmissions. In yet another embodiment of the invention, the de-allocated allocation units are used for the plurality of HARQ retransmission prior to usage of region 414.

One or more of DL MAP 410 and UL MAP 412 included in transmission frame 400 transmitted to MS 110 may be received with error or lost during transmission. Therefore, it is determined if the communication by each MS in a transmission frame is in compliance with the resource allocation information of the second group of slots. Accordingly, it is established whether each MS successfully decoded the resource allocation information of the second group of slots if the communication by each MS in the transmission frame is in compliance with the resource allocation information of the second group of slots.

In an embodiment, to detect such erroneous reception or loss of DL MAP 410 by MS 110, BS 108 provides a non-persistent allocation in allocation unit 428 of active first group of allocation units 402 in the transmission frame 400 to MS 110. However, allocation unit 428 may be a persistent allocation. A data packet is sent to MS 110 in allocation unit 428. If an Acknowledgement (ACK) or Negative Acknowledgment (NACK) is received from MS 110 for this data packet, then BS 108 establishes that MS 110 has received DL MAP 410 and decoded it correctly.

Similarly UL MAP 412 included in transmission frame 400 transmitted to MS 110 may be received with error or lost during transmission. In an embodiment, to detect such erroneous reception or loss of UL MAP 412 by MS 110, BS 108 provides allocation unit 430 of active first group of allocation units 404 in the transmission frame 400 to MS 110. If MS 110 transmits data packets in allocation unit 430, then BS 108 establishes that MS 110 has received UL MAP 412 and decoded it correctly.

In another embodiment, BS 108 may transmit a de-allocation IE in UL MAP 412 to MS 110 indicating MS 110 to de-allocate from allocation unit 422 in transmission frame 400. Further, a non-persistent allocation is made for MS 110 in allocation unit 430. However, allocation unit 430 may be a persistent allocation. If BS 108 receives a data packet in allocation unit 430, then BS 108 establishes that MS 110 decoded UL MAP 412 containing the de-allocation IE. Thereafter, BS 108 may allocate de-allocated allocation unit 422 in a second transmission frame 426 to a MS of the plurality of MSs.

Figure 5:
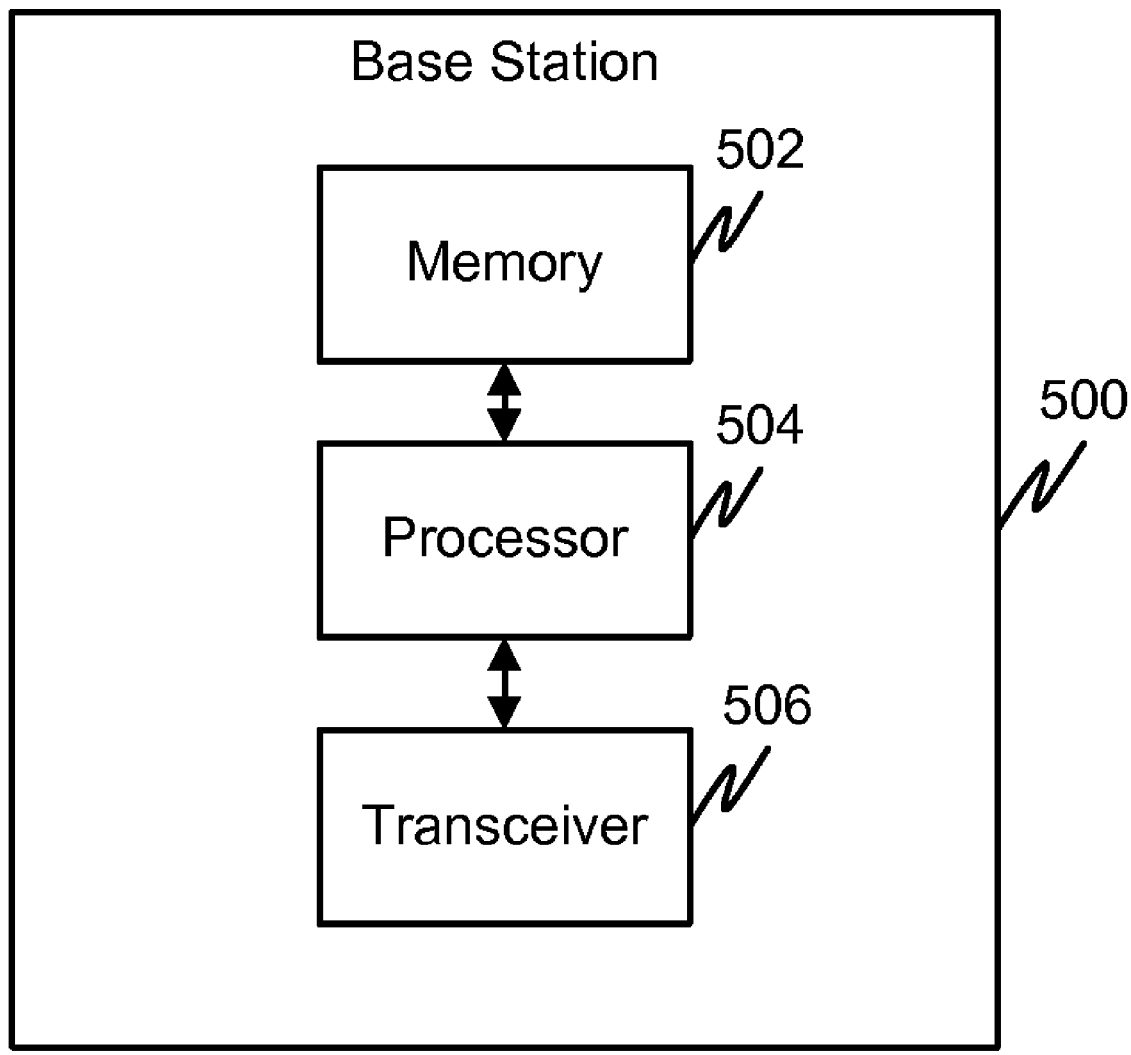
FIG. 5 is a block diagram illustrating an apparatus i.e. base station for communication in a wireless communication system in accordance with an embodiment of the invention.

FIG. 5 illustrates a block diagram showing a BS 500 for communication in a wireless communication network for example, wireless communication 100, in accordance with an embodiment of the invention. BS 500 includes a memory 502, a processor 504 coupled to memory 502 and a transceiver 506 coupled to processor 504.

Processor 504 generates a plurality of first groups of allocation units based on one or more of a plurality of Modulation and Coding Schemes (MCSs) and traffic characteristics in wireless communication system 100. A first group of allocation units of the plurality of first groups of allocation units includes one or more allocation units. An allocation unit includes one or more slots, i.e., frequency and time slots in which a MS transmits data packets to BS 500 or receives data packets from BS 500. BS 500 groups one or more allocation units together to form a first group based on a MCS employed for transmitting the resource allocation information, the data packets and the traffic characteristics. The traffic characteristics is explained in detail in conjunction with FIG. 2. Each first group of allocation units is associated with a periodicity and a size of a data packet. Further, as the first group of allocation units is associated with a particular MCS, each allocation unit of a first group of allocation units is of the same size.

In an embodiment, BS 500 may select a plurality of MCSs from various MCSs used in the wireless communication system. The plurality of MCSs may be a pre-defined number of MCSs decided by BS 500. The pre-defined number of MCSs may be a reduced number of MCSs of the various MCSs. Each first group of allocation units of the plurality of first groups of allocation units is associated with a MCS of the plurality of MCSs. Thus, number of first groups of allocation units in the plurality of first groups of allocation units may be reduced due to the usage of pre-defined number of MCSs.

Thereafter, processor 504 generates a second group of slots including resource allocation information for mapping each first group of allocation units to one or more MSs of a plurality of MSs based on MCSs and traffic characteristics associated with each first group of allocation units and the one or more MSs. The resource allocation information may be stored in memory 502. The mapping is performed based on a MCS and traffic characteristics associated with each first group of allocation units and the one or more MSs. Thus, BS 500 compares a MCS and traffic characteristics associated with a first group of allocation units of the plurality of first group of allocation units with MCSs and traffic characteristics associated with the plurality of MSs. Thereafter, BS 500 maps a MS of the plurality of MSs having a MCS and traffic characteristics same as that of the first group of allocation units to an allocation unit of the first group of allocation units. This mapping information for the MS is included in the resource allocation information. The process of mapping the resource allocation information is explained in detail in conjunction with FIGS. 2 and 4.

Thereafter, transceiver 506 transmits the resource allocation information to each MS of the plurality of MSs. Each MS receives and decodes the resource allocation information. Once each MS receives the resource allocation information, processor 504 allocates each first group of allocation units to one or more MSs based on one of the resource allocation information and a communication state associated with each MS of the plurality of MSs. The one or more MS and a first group of allocation units allocated to the one or more MSs have a same MCS and traffic characteristics. In addition to the MCS and traffic characteristics associated with an MS of the plurality of MSs, a communication state of the MS further determines allocation of the MS to a first group of allocation units of the plurality of first groups of allocation units.

There may be instances when the resource allocation information transmitted to the plurality of MSs may be received with error or lost during transmission. Therefore, for reducing errors in transmission of the resource allocation information, processor 504 determines if the communication by each MS in a transmission frame is in compliance with the resource allocation information of the second group of slots. Accordingly, processor 504 establishes whether each MS successfully decoded the resource allocation information of the second group of slots if the communication by each MS in the transmission frame is in compliance with the resource allocation information of the second group of slots.

Based on the communication state associated with the plurality of MSs, processor 504 allocates the plurality of MSs in one of one or more active first group of allocation units and one or more inactive first group of allocation units of the plurality of active first groups of allocation units. During allocation of the plurality of MSs, processor 504 assigns an active first group of allocation units of the one or more active first groups of allocation units to the one or more MS of the plurality of MSs in the active communication state. A MCS and traffic characteristics associated with the active first group of allocation units corresponds to MCSs and traffic characteristics associated with the one or more MSs.

For example, BS 500 identifies one or more MSs from the plurality of MSs based on a communication state associated with each MS of the one or more MSs. If the one or more MSs is identified as in the active communication state, then BS 500 assigns the one or more MSs to an active first group of allocation units.

Prior to assigning a MS of the one or more MSs to an active first group of allocation units, a MCS associated with the MS in the active communication state is verified. To this end, processor 504 verifies whether the MCS associated with the MS is different from a MCS associated with the one or more active first group of allocation units. For example, transceiver 506 may receive a request for a MCS from a MS of the plurality of MSs. If the requested MCS is different, then BS 500 transforms the requested MCS to a MCS similar to the requested MCS, of the plurality of MCSs associated with one or more active first groups of allocation units. Thereafter, BS 500 allocates resources in the active first group of allocation units to the MS. As a result, a number of MCS employed in wireless communication system 100 is controlled.

Subsequent to allocation of the active first group of allocation units to the MS, transceiver 506 may receive a request for a change to a new MCS from the MS by providing a channel feedback to BS 500. The request for the new MCS is made by the MS when a quality of a communication channel between the MS and BS 500 deviates from an acceptable level. In such a situation, processor 504 verifies whether the new MCS requested by the MS is different from each MCS of the one or more active first groups of allocation units. If the requested MCS is different, then processor 504 transforms the requested MCS to a MCS similar to the requested MCS, of the plurality of MCSs associated with one or more active first groups of allocation units. Thereafter, processor 504 transitions MS 114 from a previously allocated active first group of allocation unit to another active first group of allocation units associated with the transformed MCS. Alternatively, processor 504 may transition MS 114 to an active first group of allocation units associated with the requested MCS.

In an embodiment, processor 504 transitions a MS based on a feedback received by BS 500 from the MS over a predefined averaging window. The feedback received by transceiver 506 includes link quality measurements associated with a DL and a UL between the MS and BS 500. The link quality measurements is explained in conjunction with FIG. 3. A time period of the predefined averaging window is increased to a predefined value so as to increase a time period between requests received at BS 500 from an MS for a change in a MCS.

Further, processor 504 assigns an inactive first group of allocation units of the one or more inactive first group of allocation units to one or more MSs of the plurality of MSs in the inactive communication state. Processor 504 performs this process based on an MCS and traffic characteristics associated with the inactive first group of allocation units and the one or more MSs. Thus, a MCS and traffic characteristics associated with the inactive first group of allocation units corresponds to MCSs and traffic characteristics associated with the one or more MSs.

For example, BS 500 identifies one or more MSs from the plurality of MSs based on a communication state associated with each MS of the one or more MSs. If the one or more MSs is identified as in the inactive communication state, then BS 500 assigns the one or more MSs to an inactive first group of allocation units.

Prior to assigning a MS of the one or more MSs to an inactive first group of allocation units, a MCS associated with the MS in the inactive communication state is verified. Thus, processor 504 verifies whether the MCS associated with the MS is different from a MCS associated with the one or more inactive first group of allocation units. The MCS associated with the MS may be a MCS requested to BS 500 by the MS. If the MCS associated with the MS is different, then processor 504 transforms the requested MCS to a MCS similar to the requested MCS, of the plurality of MCSs associated with one or more inactive first groups of allocation units. Thereafter, processor 504 allocates the MS with resources in the inactive first group of allocation units. As a result, a number of MCS employed in wireless communication system 100 is controlled.

Subsequent to allocation of the inactive first group of allocation units to the MS, transceiver 506 may receive a request for a change to a new MCS along with a channel feedback from a MS. The request for the new MCS may be made by the MS when the MS changes from the inactive communication state to the active communication state. In such a situation, BS 500 verifies whether the new MCS requested by the MS is different from each MCS of one or more inactive first groups of allocation units. If the requested MCS is different, BS 500 transitions the requested MCS to a MCS, similar to the requested MCS, of the plurality of MCSs associated with one or more active first groups of allocation units. As a result, a number of MCS employed in wireless communication system 100 is controlled. Thereafter, BS 500 transitions the MS from a previously allocated inactive first group of allocation units to another inactive first group of allocation units associated with the transformed MCS.

When BS 500 allocates a MS with resources in a new first group of allocation units in response to a request for a change in MCS received by transceiver 506 from the MS. In this case, an allocation unit of a first group of allocation units previously allocated to the MS is de-allocated. The de-allocated allocation unit is referred to as a hole.

In an embodiment, processor 504 may allocate the de-allocated allocation unit of the first group of allocation units to a MS of the plurality of MSs based on a MCS and traffic characteristics associated with the first group of allocation units having the de-allocated allocation unit. Alternatively, processor 504 may allocate the de-allocated allocation unit of the first group of allocation units for one or more HARQ retransmissions associated with one or more MSs of the plurality of MSs. The allocation of a de-allocated allocation unit is explained in conjunction with FIG. 4.

Various embodiments of the invention disclosed above provide an improved method of allocating resources to plurality of MSs in a wireless communication system. One or more MSs of the plurality of MSs are allocated in a first group of allocation units associated with a single MCS. Further, allocation units of the first group of allocation units allocated to the one or more MSs have the same size. Therefore, the IEs associated with MCSs of the one or more MSs and size of the allocation units need not be transmitted in each transition frame associated with a periodic transmission of data packets is reduced. As a result, MAP over head is reduced in a wireless communication system. Also, as a result of the same size of allocation units in a first group, a MS employing a same MCS may be assigned de-allocated allocation units (i.e. hole) in the first group of allocation units without a need of shifting resources for one or more MSs in the first group of allocation units for allocating de-allocated units to the MS. Further, due to usage of reduced number of MCS levels and limiting frequency of MCS changes by the plurality of MSs efficient resource management is achieved.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the dependency of this application and all equivalents of those claims as issued.

What is claimed is:

1. A method of communication in a wireless communication system, the method comprising:
    generating a first transmission frame, the first transmission frame including a group of allocation units and a group of slots, wherein the group of allocation units is characterized by a first modulation and coding scheme (MCS) and a first traffic characteristics (TC), and the first TC being characterized by a first periodicity and a first size of a data packet, the generating comprising:
        allocating, within the group of allocation units, a first sub-group of allocation units and a second sub-group of allocation units associated with a first mobile station and a second mobile station respectively, wherein the first mobile station and the second mobile station are both configured to use the first MCS and the first TC, and
        providing, within the group of slots, resource allocation information representative of the allocating, the resource allotation information including information elements (IEs) indicating a boundary of the group of allocation units and location information of the first and second sub-groups of allocation units within the group of allocation units; and
    generating a second transmission frame subsequent to the first transmission frame, the second transmission frame not including the information elements (IEs),
    wherein the generating a first transmission frame and generating a second transmission frame are performed by one or more processors.

2. The method of claim 1, wherein the providing information elements (IEs) indicating location information includes providing information elements indicating at least one of positions or sizes of the first and second sub-groups.

3. The method of claim 1, wherein the allocating includes one of providing persistent allocating and non-persistent allocating.

4. The method of claim 1, wherein the providing resource allocation information includes providing a DL MAP.

5. The method of claim 1, wherein the providing resource allocation information includes providing at least one of a UL MAP and a DL MAP.

6. The method of claim 1, wherein the first mobile station and the second mobile station are in a communication state, and the group of allocation units is further characterized by the communication state.

7. The method of claim 6, wherein the communication state is one of active and inactive.

8. The method of claim 1, further comprising:
    allocating a de-allocated sub-group of the group of allocation units to a third mobile station, the third mobile station configured to use the first MCS and first TC.

9. The method of claim 1, further comprising:
    allocating a de-allocated sub-group of the group of allocation units for a hybrid automatic repeat request (HARQ) retransmission.

10. The method of claim 1, further comprising:
    verifying if a MCS associated with a third mobile station differs from the first MCS; and
    transforming the MCS associated with the third mobile station to the first MCS based on the verifying.

11. The method of claim 1, further comprising:
    transitioning the second mobile station from the group of allocation units associated with the first MCS to a second group of allocation units associated with a second MCS based on a feedback received from the second mobile station over a predefined averaging window.

12. A base station for communication in a wireless communication system, the base station comprising:
    a memory;
    a processor coupled to the memory, the processor configured to perform:
        generating a first transmission frame, the first transmission frame including a group of allocation units and a group of slots, wherein the group of allocation units is characterized by a first modulation and coding scheme (MCS) and a first traffic characteristics (TC), and the first TC being characterized by a first periodicity and a first size of a data packet, the generating comprising:
            allocating, within the group of allocation units, a first sub-group of allocation units and a second sub-group of allocation units associated with a first mobile station and a second mobile station respectively, wherein the first mobile station and the second mobile station are both configured to use the first MCS and the first TC, and
            providing, within the group of slots, resource allocation information representative of the allocating, the resource allocation information including information elements (IEs) indicating a boundary of the group of allocation units and location information of the first and second sub-groups of allocation units within the group of allocation units;
        generating a second transmission frame subsequent to the first transmission frame, the second transmission frame not including the information elements (IEs); and
    a transceiver coupled to the processor, the transceiver configured to transmit the resource allocation information to the first mobile station and the second mobile station.

13. The base station of claim 12, wherein the providing information elements (IEs) indicating location information includes providing information elements indicating at least one of positions or sizes of the first and second sub-groups.

14. The base station of claim 12, wherein the allocating includes one of providing persistent allocating and non-persistent allocating.

15. The base station of claim 12, wherein the providing resource allocation information includes providing a DL MAP.

16. The base station of claim 12, wherein the providing resource allocation information includes providing at least one of a UL MAP and a DL MAP.

17. The base station of claim 12, wherein the first mobile station and the second mobile station are in a communication state, and the group of allocation units is further characterized by the communication state.

18. The base station of claim 17, wherein the communication state is one of active and inactive.

19. The base station of claim 12, the processor being further configured to perform:
    allocating a de-allocated sub-group of the group of allocation units to a third mobile station, the third mobile station configured to use the first MCS and first TC.

20. The base station of claim 12, the processor being further configured to perform:
    allocating a de-allocated sub-group of the group of allocation units for a hybrid automatic repeat request (HARQ) retransmission.

21. The base station of claim 12, the processor being further configured to perform:
   verifying if a MCS associated with a third mobile station differs from the first MCS; and
   transforming the MCS associated with the third mobile station to the first MCS based on the verifying.

22. The base station of claim 12, the processor being further configured to perform:
   transitioning the second mobile station from the group of allocation units associated with the first MCS to a second group of allocation units associated with a second MCS based on a feedback received from the second mobile station over a predefined averaging window.

23. A base station for communication in a wireless communication system, the base station comprising:
   a, memory; and
   a processor coupled to the memory, the processor configured to perform:
      generating a first transmission frame, the first transmission frame including a group of allocation units and a group of slots, wherein the group of allocation units is characterized by a first modulation and coding scheme (MCS) and a first traffic characteristics (TC), and the first TC being characterized by a first periodicity and a first size of a data packet, the generating comprising:
         providing, within the group of slots, resource allocation information, the resource allocation information including information elements (IEs) indicating a boundary of the group of allocation units and location information of a first sub-group and a second sub-group of allocation units within the group of allocation units, the first and second sub-groups associated with a first mobile station and a second mobile station respectively, wherein the first mobile station and the second mobile station are both configured to use the first MCS and the first TC; and
      generating a second transmission frame subsequent to the first transmission frame, the second transmission frame not including the information elements (IEs).

\* \* \* \* \*

UNITED STATES PATENT AND TRADEMARK OFFICE
CERTIFICATE OF CORRECTION

PATENT NO. : 8,208,433 B2  
APPLICATION NO. : 12/372678  
DATED : June 26, 2012  
INVENTOR(S) : Chakraborty et al.

Page 1 of 1

It is certified that error appears in the above-identified patent and that said Letters Patent is hereby corrected as shown below:

Title Page, underneath Item (65), please add --Related U.S. Application Data (60) Provisional Application No. 61/066,344, filed on Feb. 19, 2008.--

Column 17, Line 17, replace "a, memory;" with --a memory;--

Signed and Sealed this
Twenty-first Day of August, 2012

David J. Kappos
*Director of the United States Patent and Trademark Office*